Dec. 14, 1965   P. G. BRUNDELL ETAL   3,223,130
MACHINE FOR DEBRANCHING FELLED TREES
Filed Nov. 26, 1963                                   2 Sheets-Sheet 1

3,223,130
MACHINE FOR DEBRANCHING FELLED TREES
Per Gunnar Brundell, Tolffors, Gavle, Sweden, and Karl-Erik Arnold Jonsson, Brunnsgatan 63C, Gavle, Sweden
Filed Nov. 26, 1963, Ser. No. 326,137
Claims priority, application Sweden, Dec. 21, 1962, 13,871/62
2 Claims. (Cl. 144—2)

The invention relates to a machine for debranching felled trees. The machine has a certain similarity to known debarking machines of the hollow-rotor type but differs from these machines on decisive points as regards its particular function. Above all, the debranching members must be able to engage the branches with a considerable force so that also thick branches can be removed without difficulty.

The machine according to the invention comprises a stator, a hollow rotor journalled on the stator, a plurality of arms mounted on the rotor for swinging movement toward and away from the central axis of the rotor about pivots substantially parallel to said axis, cutting members mounted on the arms to engage the branches of a tree passing axially through the rotor, a weight secured to the pivoted end of each arm radially outside the pivot in question, said weight being adapted, when the rotor is rotated, to be acted upon by the centrifugal force so as to swing the arm inwardly, and links connecting each such weight to adjacent weights in the peripheral row of weights, so that a cutting member engaging a tree will be actuated by forces derived from the total mass of all said weights.

In the accompanying drawings.

Figure 1:
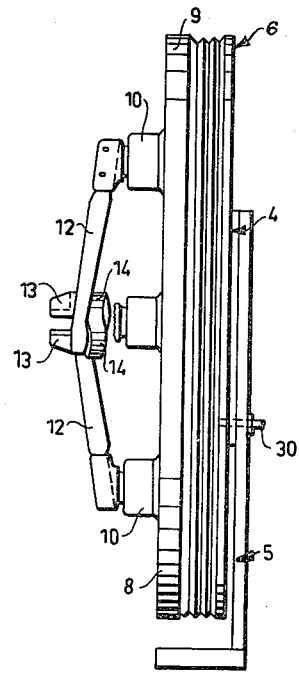
FIGURE 1 shows an embodiment of the machine as seen from one side.

An annular stator 4 (FIG. 2) is secured to a frame 5 intended to be mounted on a preferably transportable support, such as a vehicle. The stator carries a rotor 6 composed by a ring 7 journalled on the stator (FIGS. 2 and 3), an annular end wall 8 at the fore end of the ring, and a cylindrical portion 9 secured to the outer periphery of the wall 8. Externally said cylinder 9 is designed as a scored pulley for V-belt drive. Four bearing cages 10 uniformly spaced around the rotor are provided on the fore end wall 8 to serve as bearings for shaft pivots 11 parallel to the axis of the rotor.

Figure 2:
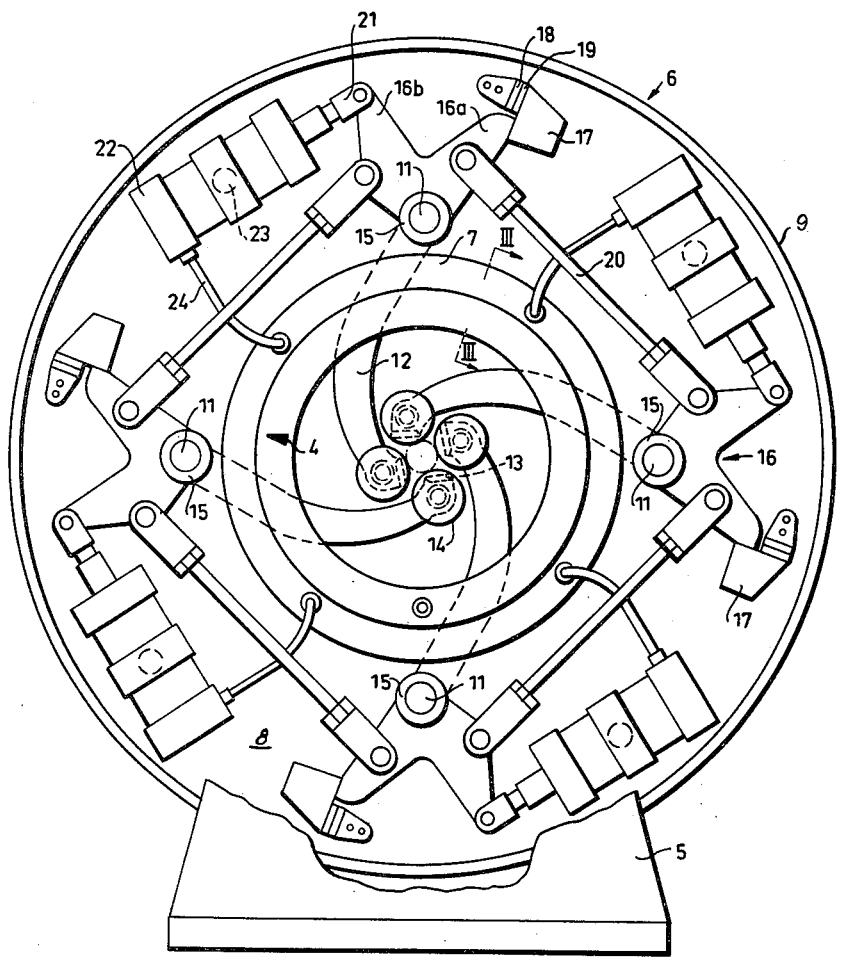
FIGURE 2 shows the machine from the rear with part of the frame and a rear cover plate of the rotor removed.

Outside the bearings 10 the shafts 11 carry arms 12 adapted to swing to and from the axis of the rotor. In the embodiment shown these arms are slightly arcuate, as seen from one end of the rotor (FIG. 2). At its free end each arm 12 carries a knife blade 13 facing the axis of the rotor. The edge of each blade 13 is substantially parallel to said axis and directed outwardly to the pertaining shaft pivot. Preferably the knife blades 13 project axially in front of the arms 12 at the inlet end of the rotor, as seen in FIG. 1. Near the knife blade each arm also carries a rotatable roller 14 dimensioned such that its periphery is located slightly outwardly of the edge of the knife blade 13. When the machine is in operation, the rollers serve as spacing members in that they roll against the trunk of the tree and prevent the edges of the knives from coming into contact with it. Thus, the only function of the knives is to cut off limbs and branches projecting from the trunk. Alternatively, the rollers may be replaced by immovable rounded spacing members.

Clutch sleeves 15 are mounted on the opposite ends of the shaft pivots 11, which project from the rear side of the rotor wall 8 (FIG. 2). Each such sleeve 15 has welded thereto a crank designed as a substantially V-shaped plate 16. One leg 16a of said plate 16 is directed opposite to the arm 12 secured to the same shaft pivot 11. The outer end of the leg 16a carries a rather heavy block or weight 17. At the inward movement of the arm 12, the weight 17 is stopped by a stop member 18 when the roller 14 on the end of the arm is at a little distance from the axis of the rotor. A shock absorbing pad 19 of rubber or the like may be secured to either of the cooperating surfaces of the weight 17 and of the stop member 18. Further, each leg 16a is linked by means of a swivel rod 20 to the leg 16b of the adjacent crank 16, and thus all the arms 12 are swung simultaneously through equally great angles to and from the centre line of the rotor.

The legs 16b of the cranks 16 are linked to piston rods 21 projecting from pressure-fluid driven cylinders 22 and which are pivotably mounted on the rotor wall 8 by means of pivots 23. The object of the cylinders is to swing the arms 12 clockwise in FIG. 2, i.e. outwards from the axis of the rotor, and for this purpose their rear ends are connected to flexible tubes 24 through which pressure fluid can be supplied. However, the supply of pressure fluid to a rotary part involves certain problems, and therefore a device suitable for this purpose will be described below with reference to FIG. 3.

Figure 3:
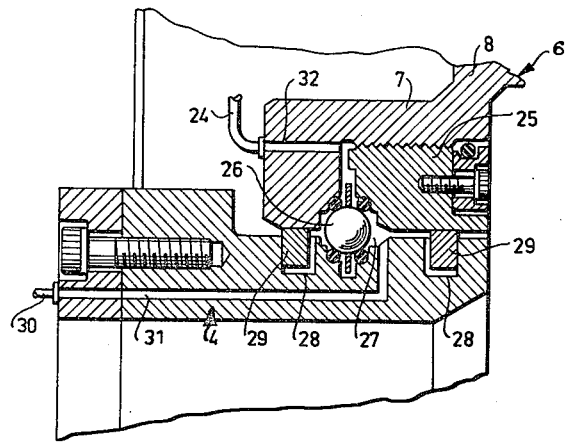
FIGURE 3 shows, on a larger scale, a fragmentary section through the stator and rotor on the line III—III in FIG. 2.

As seen in FIG. 3, the inner rotor ring 7 and another ring 25 screwed into it are supported on the stator ring 4 by means of a wire ball bearing 26 located in an annular space 27 formed between said rings 7 and 25. On both sides of the space 27 the exterior of the stator ring 4 is provided with peripheral grooves 28 rectangular in cross section. Sealing rings 29 designed as piston rings are inserted in said grooves 28 to engage the inner walls of the rotor rings 7 and 25 and thereby to take part in the rotation of the rotor. In this way, the annular space 27 surrounding the ball bearing is sealed outwardly and can be utilized for transmitting the pressure fluid. Thus, a conduit 30 extending from a source of pressure fluid is connected to a passage 31 from one end of the stator ring 4 to the space 27, and passages 32 through the rotor ring 7 connect the space 27 with the tubes 24 extending to the cylinders 22. When pressure fluid is supplied by manual adjustment of a valve (not shown) inserted in the conduit 30, the overpressure built up in the space 27 causes the sealing rings 29 to be forced in opposite directions to seal against the side walls of the two grooves 28 located farthest away from the space 27. If desired, peripheral grooves may be provided in said side walls to balance the total axial pressure. Preferably air is used as pressure fluid, as a ball bearing filled with liquid (oil) under pressure is subjected to an unnecessary frictional resistance.

When the rotor described is caused to rotate clockwise in FIG. 2, the weights 17 are swung outwards or counter-clockwise by the centrifugal force into contact with the stops 18 so that the knives are positioned as shown in FIG. 2. To introduce the root end of a tree to be debranched, the arms 12 must first be swung outwards, and this is carried out by supplying pressure fluid to the cylinders 22 so that the piston rods 21 swing the lever systems clockwise against the action of the centrifugal force. As soon as the tree trunk has arrived between the knives, the pressure in the cylinders 22 is released, so that the spacing rollers 14 are swung into engagement with the trunk and thereby the knives 13 are in position to cut the branches rather close to the trunk. In the course of the operation, the various knives become temporarily subjected to a varying resistance, but owing ot the link system described an effective engagement is ensured, as each knife is actuated by the total mass forces of the whole system.

The invention is not limited to the embodiment described. For instance, the number of pivotal arms carrying debranching members may be greater or smaller, and it may be sufficient to connect pressure fluid cylinders to one or some of the arms only. In that case a lack of balance may be compensated for by means of counterweights. Further, the debranching members may be designed differently from those shown. For instance, each knife may have its edge turned axially onto an incoming tree whereby an additional spacing member may be dispensed with.

What we claim is:

1. A machine for debranching felled trees, comprising a hollow stator, a hollow rotor journalled on the stator, a plurality of arms mounted on the rotor for swinging movement toward and away from the central axis of the rotor about pivots substantially parallel to said axis, cutting members mounted on the arms to engage the branches of a tree passing axially through the rotor, a weight secured to the pivoted end of each arm radially outside the pivot in question, said weight being adapted, when the rotor is rotated, to be acted upon by the centrifugal force so as to swing the arm inwardly, and links connecting each such weight to adjacent weights in the peripheral row of weights, so that a cutting member engaging a tree will be actuated by forces derived from the total mass of all said weights.

2. A machine for debranching felled trees, comprising a hollow stator, a hollow rotor journalled on the stator, a plurality of arms mounted on the rotor for swinging movement toward and away from the central axis of the rotor about pivots substantially parallel to said axis, cutting members mounted on the arms to engage the branches of a tree passing axially through the rotor, spacing members carried by the arms axially of the cutting members to prevent said cutting members from contact with the trunk of the tree, a weight secured to the pivoted end of each arm radially outside the pivot in question, said weight being adapted, when the rotor is rotated, to be acted upon by the centrifugal force so as to swing the arm inwardly, and links connecting each such weight to adjacent weights in the peripheral row of weights, so that a cutting member engaging a tree will be actuated by forces derived from the total mass of all said weights.

References Cited by the Examiner

UNITED STATES PATENTS

| | | |
|---|---|---|
| 2,477,922 | 8/1949 | Emery et al. |
| 2,860,672 | 11/1958 | Brundell et al. |
| 3,119,422 | 1/1964 | Brown. |

FOREIGN PATENTS

| | | |
|---|---|---|
| 182,522 | 7/1955 | Austria. |
| 90,089 | 9/1957 | Norway. |
| 119,397 | 4/1959 | U.S.S.R. |

WILLIAM W. DYER, JR., *Primary Examiner.*

DONALD R. SCHRAN, *Examiner.*